July 3, 1962  H. RUSKIN ET AL  3,041,618
ACTUATING MECHANISM
Filed April 30, 1959  15 Sheets-Sheet 1

INVENTORS
HENRY RUSKIN
BY ALEX CIECHANOWSKI
ATTORNEY

INVENTORS
HENRY RUSKIN
ALEX CIECHANOWSKI
BY *J. Walton Bader*
ATTORNEY

July 3, 1962

H. RUSKIN ETAL 3,041,618

ACTUATING MECHANISM

Filed April 30, 1959

INVENTORS
HENRY RUSKIN
ALEX CIECHANOWSKI
BY
J. Walton Bader
ATTORNEY

INVENTORS
HENRY RUSKIN
ALEX CIECHANOWSKI
BY
J. Walton Bader
ATTORNEY

INVENTORS
HENRY RUSKIN
ALEX CIECHANOWSKI
BY
J. Walton Bode
ATTORNEY

INVENTORS.
HENRY RUSKIN
ALEX CIECHANOWSKI
BY J. Walton Bader
ATTORNEY

July 3, 1962  H. RUSKIN ETAL  3,041,618
ACTUATING MECHANISM
Filed April 30, 1959  15 Sheets-Sheet 12

INVENTORS
HENRY RUSKIN
BY ALEX CIECHANOWSKI
J. Walton Bode
ATTORNEY

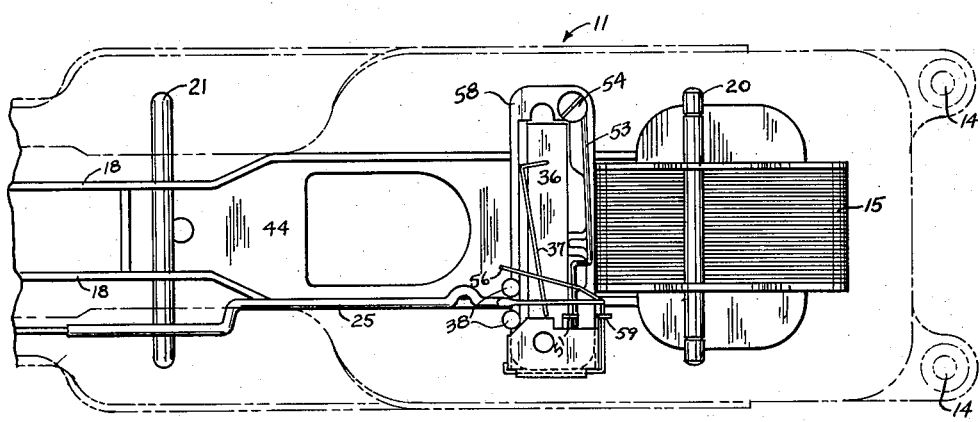
_Fig. 25_
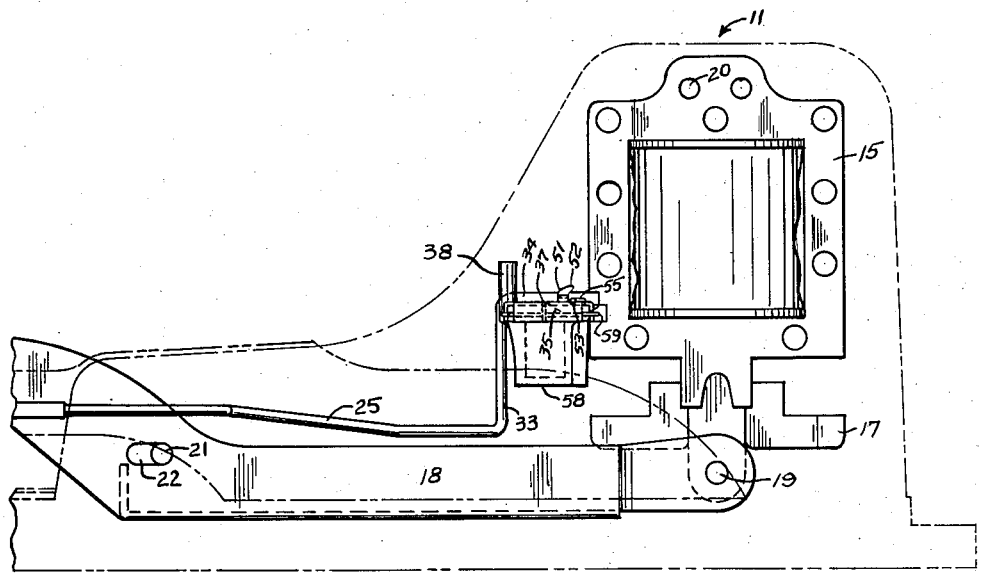
_Fig. 26_
INVENTORS
HENRY RUSKIN
BY ALEX CIECHANOWSKI
J. Walton Bader
ATTORNEY

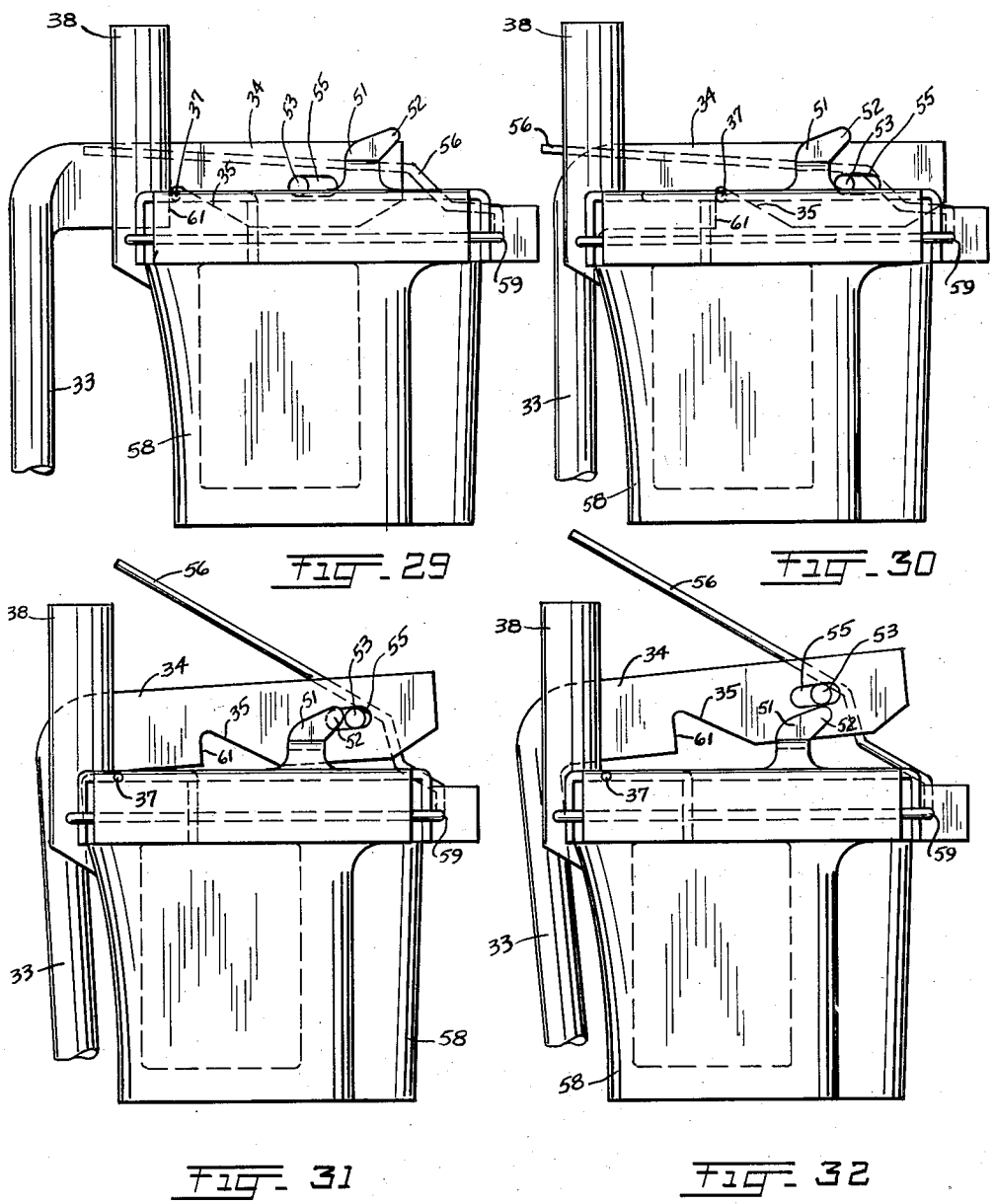

United States Patent Office 3,041,618
Patented July 3, 1962

3,041,618
ACTUATING MECHANISM
Henry Ruskin, Bayside, and Alex Ciechanowski, East Meadow, N.Y., assignors to Swingline, Inc., Long Island City, N.Y., a corporation of New York
Filed Apr. 30, 1959, Ser. No. 809,961
2 Claims. (Cl. 1—106)

This invention relates to an actuating mechanism which is particularly applicable to a fastening device. The specific forms of the invention shown in this specification relates to an actuating mechanism for an electrically operated stapling machine. It must be understood, however, that such specific showing does not detract from the generality of the invention, the scope of which is set forth in the appended claims.

The actuating device of this invention finds particular application where an electrically operated stapling machine is to be actuated automatically upon paper contact with a tripping mechanism. In such case the tripping mechanism should be actuated with the least amount of pressure possible. This is true since the thin sheets of paper used in many instances cause only a slight amount of pressure to be applied to the tripping mechanism.

Furthermore, in a device of this character, means must be provided for automatically shutting off the power means of the machine after the fastening stroke has been completed. However, operating situations do occur where the power means must be kept on for a longer period of time. For example, heavy materials will require a longer power-on time than will lighter materials. Therefore, if a mere timing mechanism is used, proper actuation of the machine will not occur and too much power will be applied for light fastening and too little power for heavy fastening.

Return spring means may also be provided for returning the tripping mechanism to its normal rest position.

One of the modifications of this invention has the further object of providing minimal pressure for actuating the mechanism but sufficient return spring pressure to reset the mechanism after completion of the driving stroke.

The foregoing exposition sets forth a number of objects of the instant invention but is not intended to be all-inclusive. Other objects may conceivably occur to those to whom the instant invention would be of interest.

In brief, the essential elements of the instant invention comprise switch means, switch actuating means engageable with the switch means to actuate the mechanism, and means for disengaging the switch means from the switch actuating means subsequent to full actuation thereof. The instant invention also may include the power means used in connection with the mechanism.

The invention will be further described by reference to the accompanying drawings which are made a part of this specification.

FIG. 1 is a top view of a fastening device with one form of an actuating mechanism made in accordance with this invention disposed thereupon. The case of the machine has been removed for clarity of illustration. In this figure, the parts are shown in the normal rest position prior to actuation of the mechanism.

Figure 9:
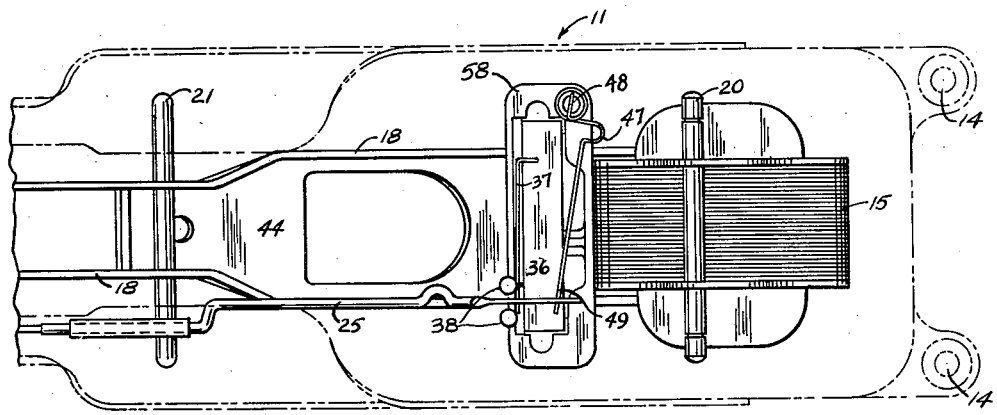

FIG. 9 is a top view of a fastening device with an alternative form of an actuating mechanism made in accordance with this invention. The case of the machine has been removed for clarity of illustration. In this figure the parts are shown in the normal rest position prior to actuation of the mechanism.

Figure 10:
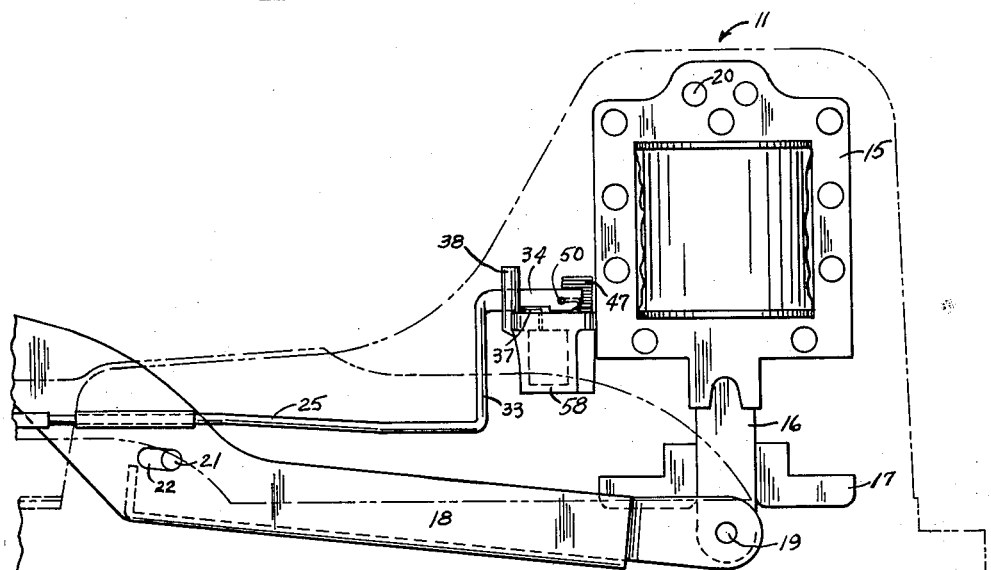

FIG. 10 is a side view of the fastening device shown in FIG. 9 with the parts of the actuating mechanism in the same position.

Figure 11:
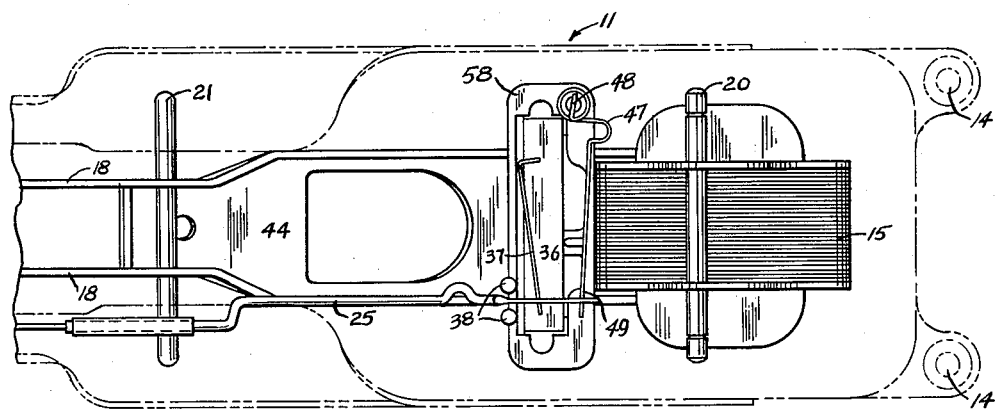

FIG. 11 is a top view of a fastening device similar to that of FIG. 9 but with the actuating member in partially actuated position showing the machine about ready to fire.

Figure 12:
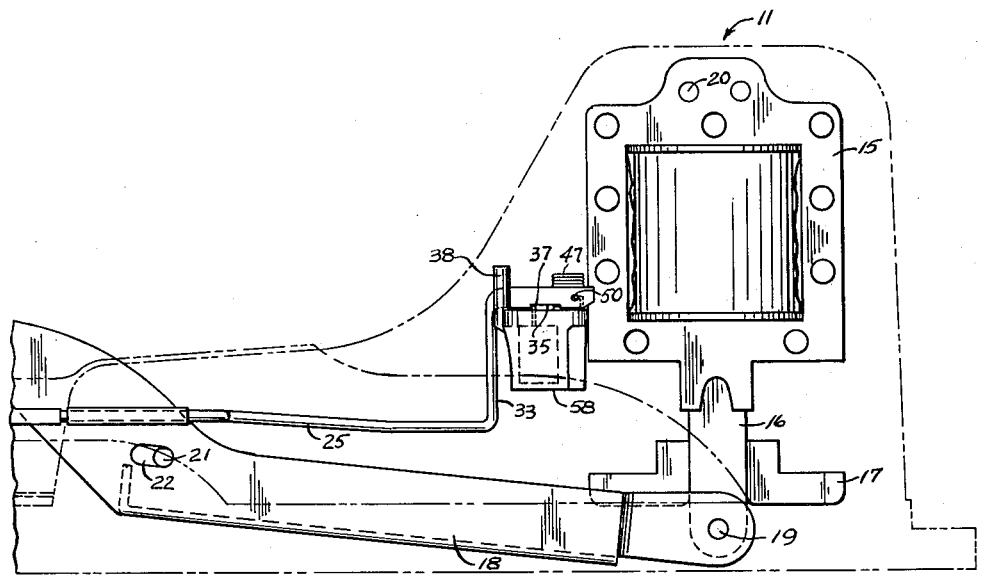

FIG. 12 is a side view of the machine with the parts thereof in the same relative position as those in FIG. 11.

Figure 13:
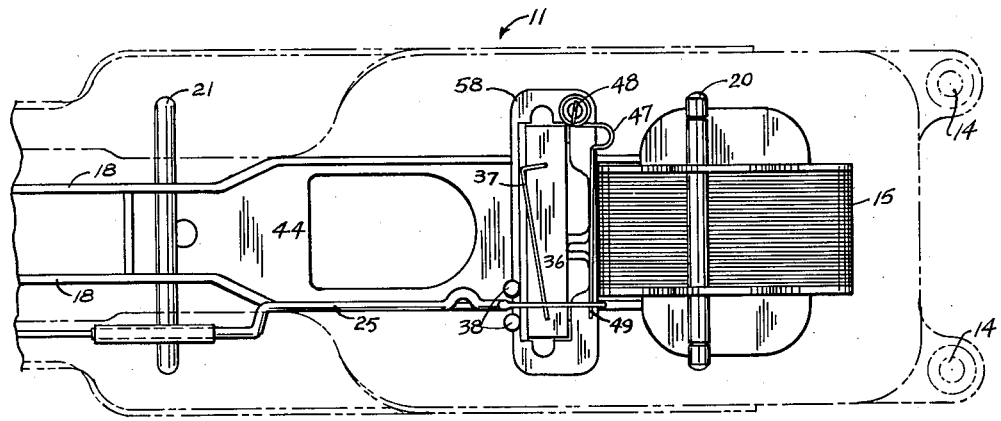

FIG. 13 is a top view of a fastening device similar to that of FIG. 9 but with the actuating member in firing position and the remainder of the parts at the intermediate point of the firing stroke.

Figure 14:
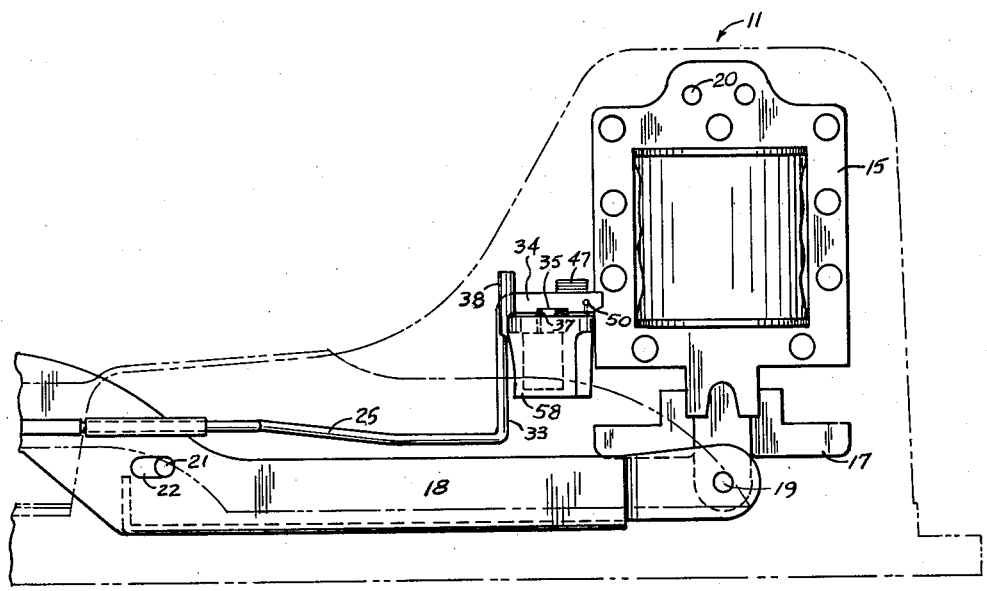

FIG. 14 is a side view of a fastening device with the parts thereof in the same position as those of FIG. 13.

Figure 15:
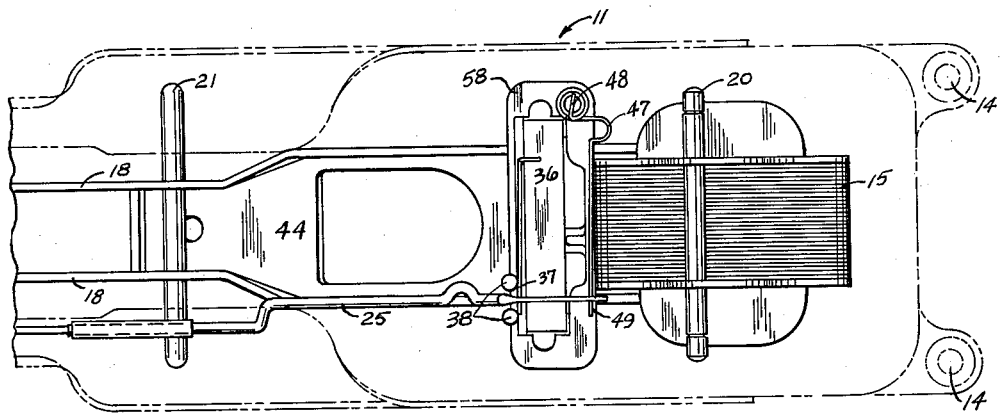

FIG. 15 is a top view of a fastening device similar to that of FIG. 9 but showing the position that the parts assume immediately after firing of the fastening device but prior to the time that the parts are reset to their normal rest position.

Figure 16:
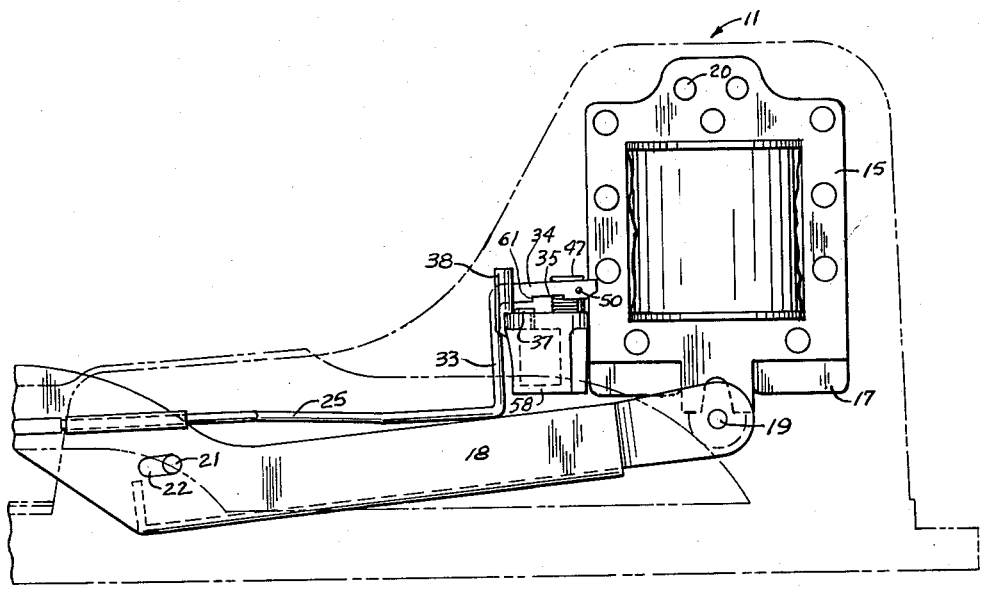

FIG. 16 is a side view of a fastening device similar to that of FIG. 15 and showing the position of the parts similar to those of FIG. 15.

Figure 17:
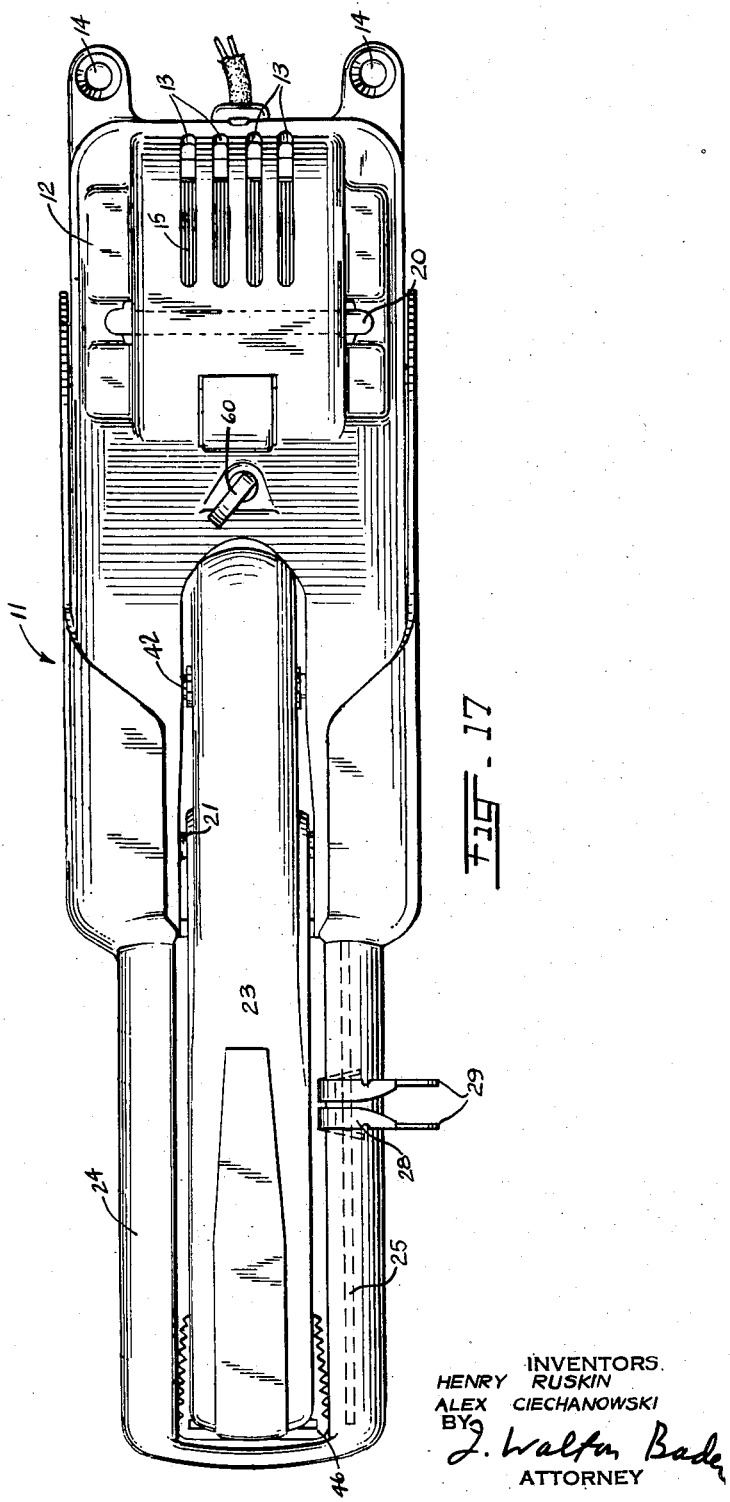

FIG. 17 is a top view of a fastening device embodying the invention set forth in the instant specification. In this case the case of the machine has not been removed.

Figure 18:
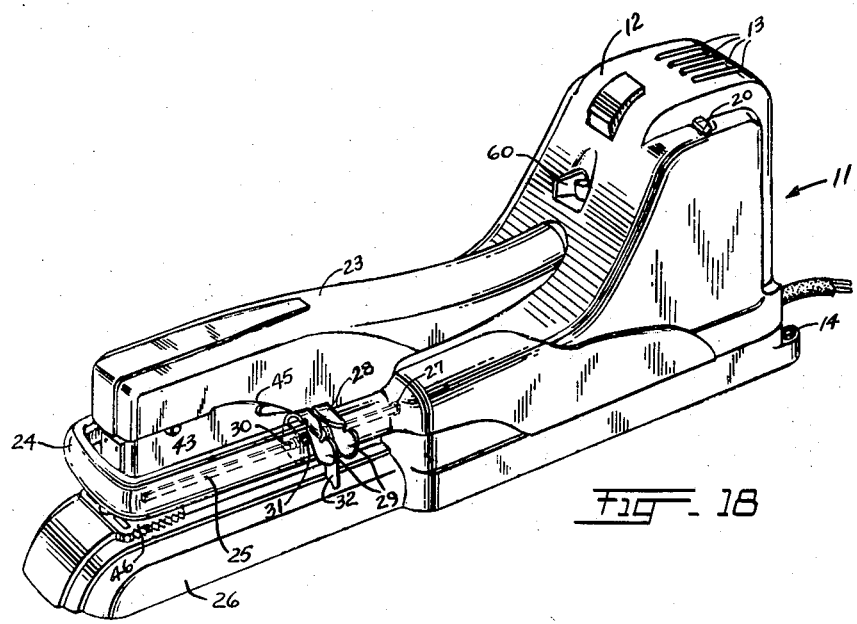

FIG. 18 is an isometric reduced side view of a fastening device similar to that of FIG. 17.

Figure 19:
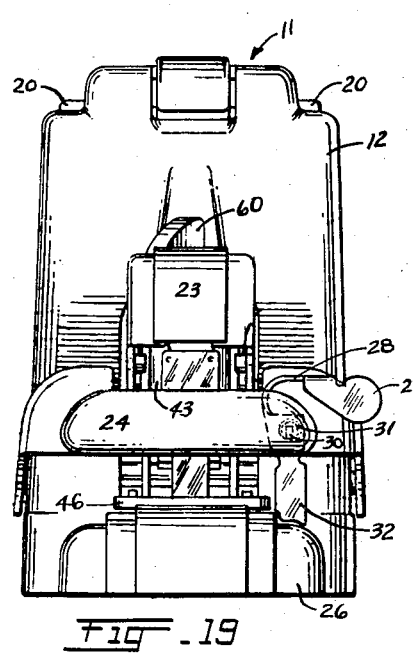

FIG. 19 is a front view of a fastening device similar to that of FIGS. 17 and 18.

Figure 20:
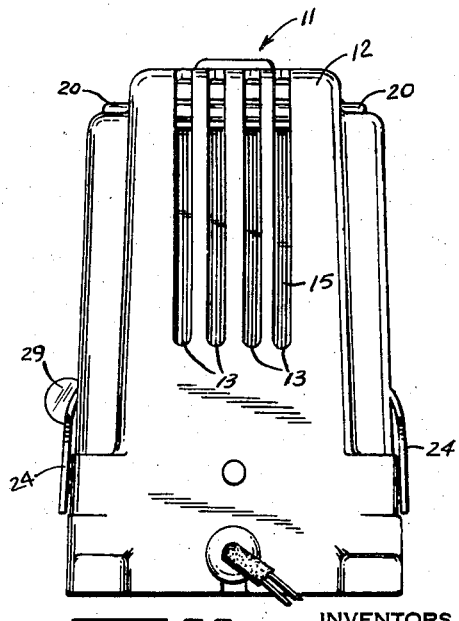

FIG. 20 is a rear view of a fastening device similar to that of FIGS. 17, 18 and 19.

Figure 21:
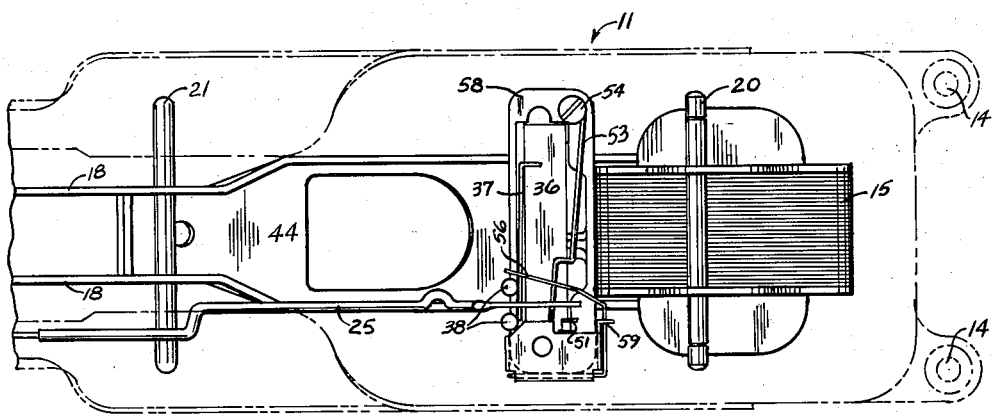

FIG. 21 is a top view of a fastening device with a further alternative form of actuating mechanism made in accordance with this invention disposed thereupon. The case of the machine has been removed for clarity of illustration. This modification shows a mechanism in which the return spring pressure is only produced after actuation of the fastening device so that spring-back pressure against the actuating member is not produced upon tripping thereof. In this figure the parts are shown in the normal rest position prior to actuation of the mechanism.

Figure 22:
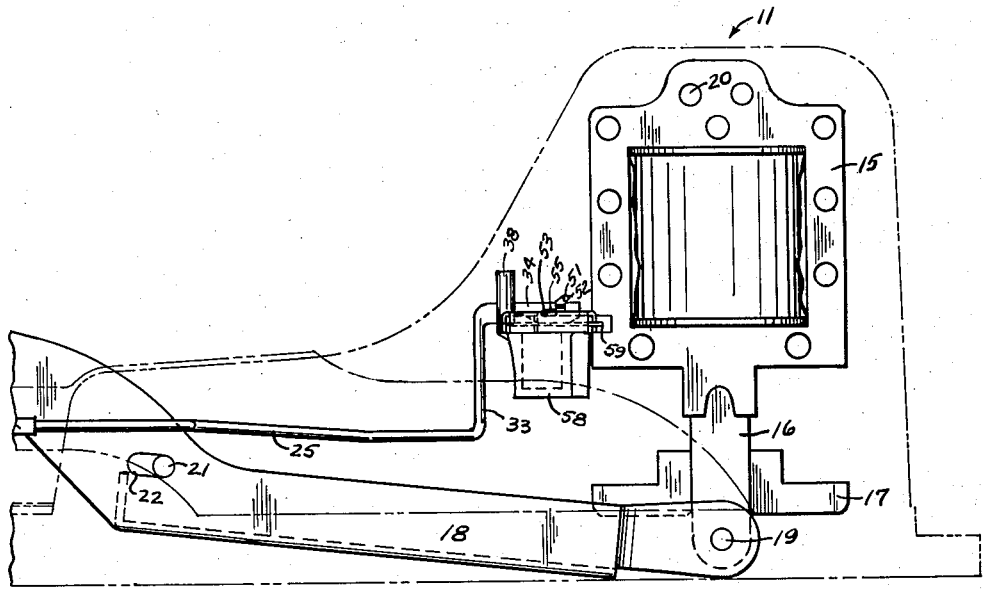

FIG. 22 is a side view of the fastening device shown in FIG. 21 with the parts thereof in the same position and with the case thereof removed for clarity of illustration.

Figure 23:
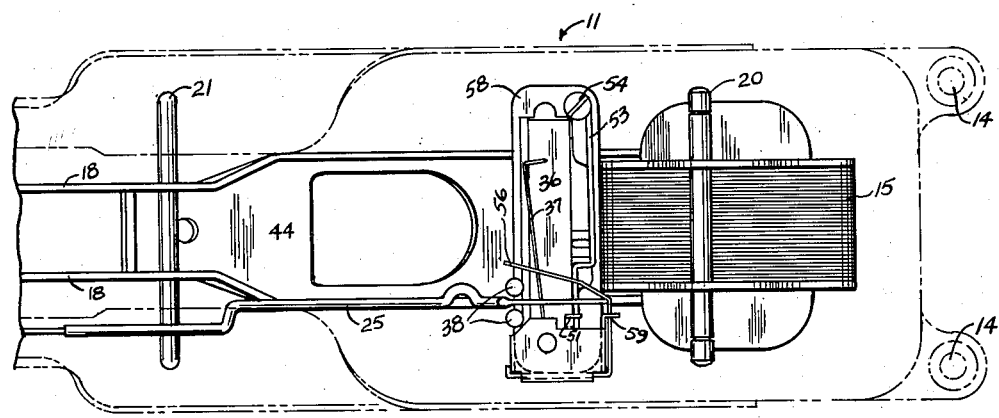

FIG. 23 is a top view of the fastening device shown in FIG. 21 but with the actuating member in partially actuated position with the fastening device about ready to fire.

Figure 24:
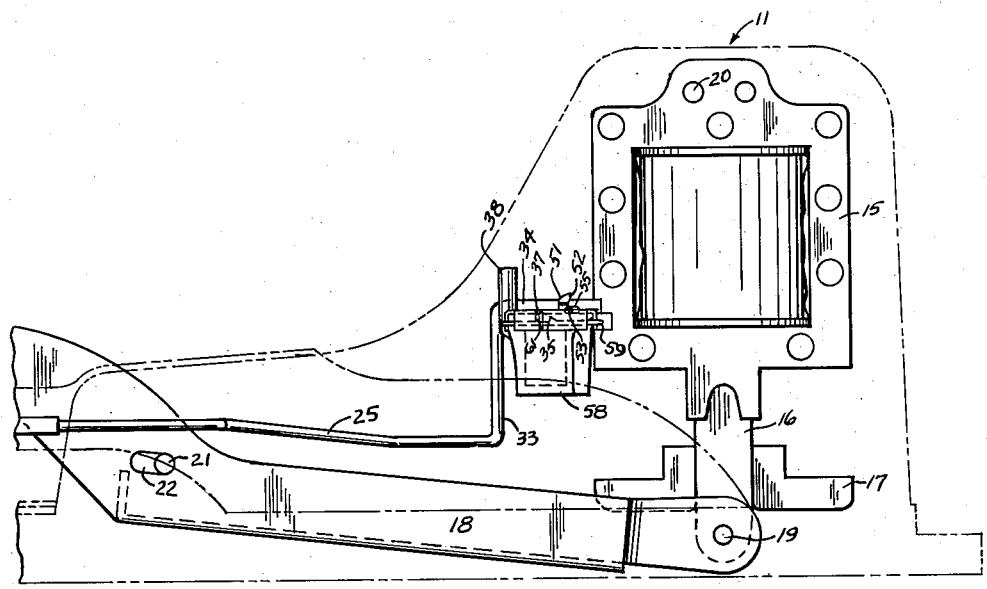

FIG. 24 is a side view of the fastening device shown in FIG. 23 with the parts thereof in the same relative positions.

FIG. 25 is a top view of a fastening device similar to that shown in FIG. 21 but with the actuating member thereupon in initial actuated position with the fastening device partially fired.

FIG. 26 is a side view of a fastening device similar to that of FIG. 25.

Figure 27:
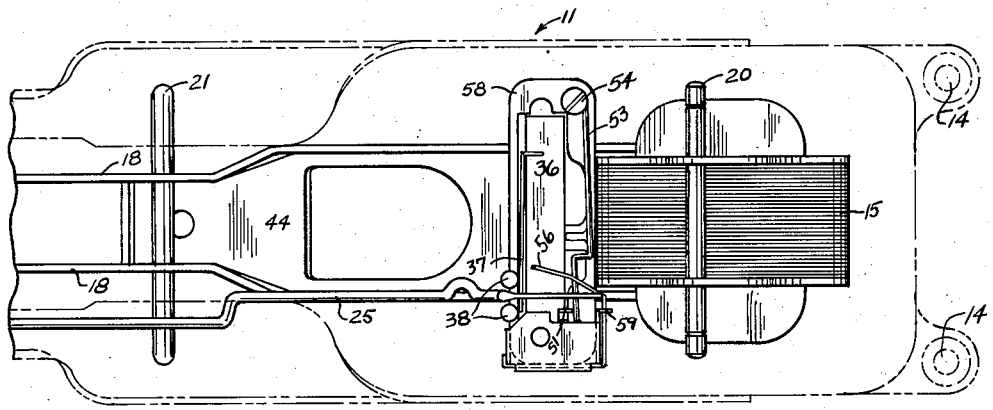

FIG. 27 is a top view of a fastening device similar to that of FIG. 24 but showing the fastening device in fully fired position and ready to reset.

Figure 28:
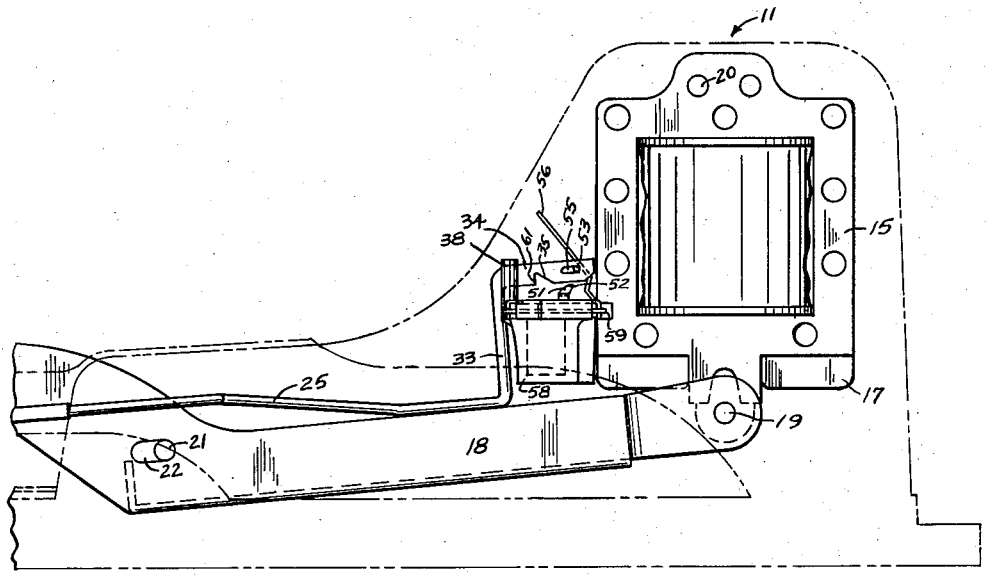

FIG. 28 is a side view of a fastening device with the parts thereof in similar position to those of FIG. 27.

FIG. 29 is a detailed enlarged side view of the regulating portion of the actuating member of this invention and associated parts. In this figure the parts involved are shown in the normal rest position prior to actuation of the mechanism.

FIG. 30 is a view similar to that of FIG. 29 but with the actuating member in the position that it assumes just prior to firing the fastening device.

FIG. 31 is a view similar to FIGS. 29 and 30 but with the actuating member and associated parts in the position that they assume immediately upon firing of the fastening device.

FIG. 32 is a view similar to FIGS. 29, 30 and 31 but with the actuating member and associated parts in the positions that they assume immediately subsequent to the firing stroke of the fastening device and showing commencement of the resetting position.

Each of the three illustrated modifications of this invention will be described in detail by reference to the accompanying drawings. The operation of the modifications of the invention will likewise be explained.

The three modifications of the invention are shown in FIGS. 1–8, FIGS. 9–16, and FIGS. 21–32. FIGS. 17–20 show a fastening device that could be employed with all three modifications shown.

The first modification of the invention described in detail will be the modification shown in FIGS. 1–8. In this modification a fastening device 11 is provided with an outer case 12 (FIGS. 17–20) provided with ventilating apertures 13 (FIGS. 17–20). Screw openings 14 may also be provided to hold the device to a rigid base.

The actuating mechanism of the invention is shown in the drawings as operating an electrically solenoid operated stapling machine. However it is to be understood that other types of machines could also be operated with this invention.

Referring now to the electrically operated stapling machine shown in the drawings a solenoid 15 is formed with an upwardly movable armature 16. A weight 17 is provided to insure return of the armature after actuation thereof.

A pair of lever arms 18 are pivotally connected on each side of armature 16 by means of pin 19. A web portion 44 is also provided joining lever arms 18 to one another. The forward portion of each of lever arms 18 are formed with a recess 45 (FIG. 18) and a projection (not shown) is secured to the head 23 (FIGS. 17–19) of the stapling machine and is disposable within each of recesses 45 when stapling is to occur.

An additional pin 21 is disposed within a slot 22 in each of arms 18 so as to permit pivotal movement of the arms.

The fastening device is also formed with a base 26 and an outer case 12. In the preferred modification of the invention these parts are integral.

A detailed description of the staple driving mechanism of the fastening device described in this specification will be found in the issued United States Patent Number 2,866,973 to Henry Ruskin on January 6, 1959.

A guard 24 is provided in front of the stapling machine which prevents injury to the operator and also serves as a mounting for the actuating rod 25 of the mechanism of this invention. Guard 24 may also be provided with graduations to aid in positioning tripping mechanism 28 on rod 25. Tripping mechanism 28 consists of a trip 32 and a pair of arms 29 each provided with an opening 30 through which rod 25 passes. Openings 30 are only slightly larger than the cross-sectional size of rod 25. Arms 30 are kept in normal spread-apart relationship by spring 31 and, in such relationship, rod 25 bears against the sides of openings 30 and holds paper trip portion 28 in temporary fixed position upon rod 25. Compression of arms 30 towards one another releases rod 25 and permits paper trip portion 28 to be moved wherever necessary along rod 25.

Rod 25 is preferably offset at 33 and is formed with a fattened regulating portion 34 provided with a recess 35. A switch 36 is also provided having a spring loaded throwing arm 37. Arm 37 is normally disposed within recess 35.

Arm 37 is spring loaded in the "on" position and goes into "off" position upon release of pressure upon arm 37. Switch 36 is normally in "off" position.

A switch which could be used as switch 36 in this invention is made by Detroit Controls Company under the trademark "Tyni-Switch" and is described in United States Patents 2,407,089 and 2,669,618.

Supports 38 are also provided adjacent regulating portion 34. An additional support 58 is also provided.

Reference characters 11–38 show features common to all modifications of this invention and appear on all figures. The reference characters now described are limited to each of the three modifications shown.

Again referring to the modification of the invention shown in FIGS. 1–8 a return spring 39 is connected to solenoid 15 at 40 and to regulating portions 34 at opening 41. Spring 39 holds rod 25 in normal rest position.

Now referring to the modification of this invention shown in FIGS. 9–16 return spring 47 is a torsion spring and is attached to support 58 at 48. The operating end 49 of spring 47 is connected to regulating portion 34 through opening 50.

Now referring to the modification of the invention shown in FIGS. 21–32 a device is shown that requires only minimal pressure for its actuation since the return spring is not actuated until the fastening device is fired. In this modification an upwardly directed cam 51 having a nose portion 52 is provided. Recess 35 in regulating portion 34 of actuating rod 25 is made in the form of a notch. A cam follower 53 is provided and is rotatably secured to support 58 at 54. One end of cam follower 53 is disposed within a slot 55 within regulating portion 34. A return spring 56 is also provided which is normally unloaded. Spring 56 is also secured to support 58 at 59.

With the foregoing detailed description the operation of each of the modifications of this invention may be described. Since the modifications shown in FIGS. 1–8 and FIGS. 9–16 are similar except for the construction of the return spring it will be sufficient to describe the operation of the modification shown in FIGS. 1–8. This description will also apply to the modification shown in FIGS. 9–16.

Arms 29 are compressed towards one another and tripping mechanism 28 moved along rod 25 to the distance desired for automatic actuation of the fastening device by impingement of the material to be fastened against trip member 32. After the desired distance is obtained arms 29 are released and tripping mechanism 28 is in secured position upon rod 25.

If the fastening device is provided with a main switch 60 as shown in FIGS. 17–19 this switch is turned on to cause electrical power to flow into the device.

The material to be fastened, such as a pair of sheets of paper, is then brought into impinging relationship with trip member 32. Pressure is then applied through the material to be fastened upon trip member 32 thereby moving actuating rod 25 against the pressure of return spring 39. As rod 25 is moved the side 61 of recess 35 within regulating portion 34 bears against arm 37 of switch 36 and actuates switch 36. Power then flows into solenoid 15 causing armature 16 to move upwardly.

Figure 1:
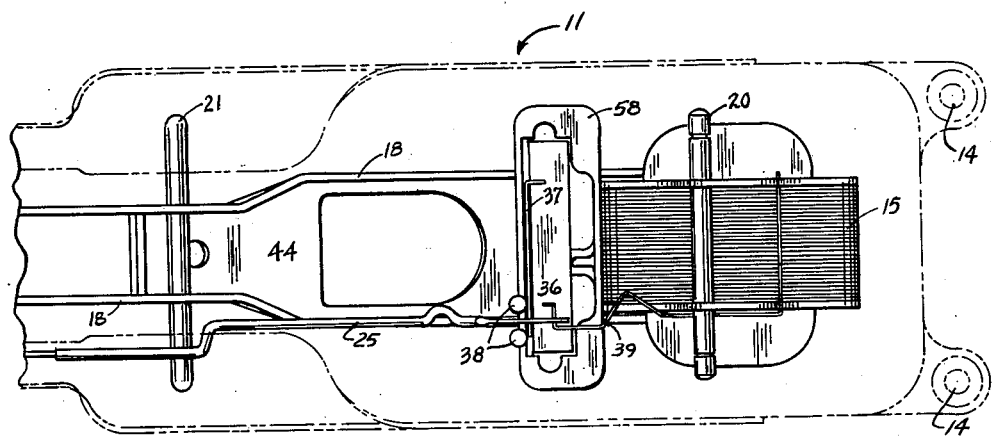
Figure 2:
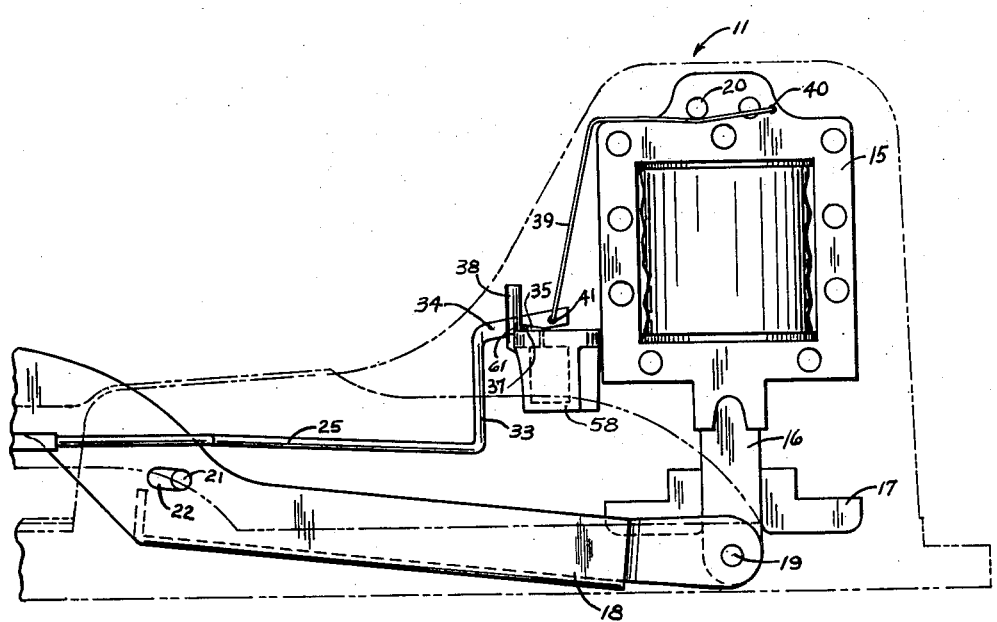
FIG. 2 is a side view of the fastening device shown in FIG. 1, again with the case removed for clarity of illustration. In this figure, the actuating mechanism is also shown in the normal rest position prior to actuation.
Figure 3:
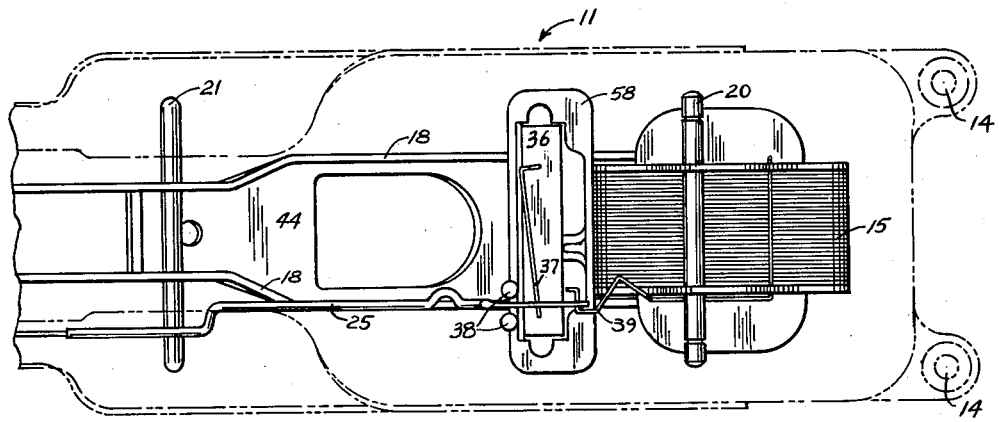
FIG. 3 is a top view similar to that of FIG. 1 except that the actuating member is shown in partially actuated position where the machine is just ready to fire.
Figure 4:
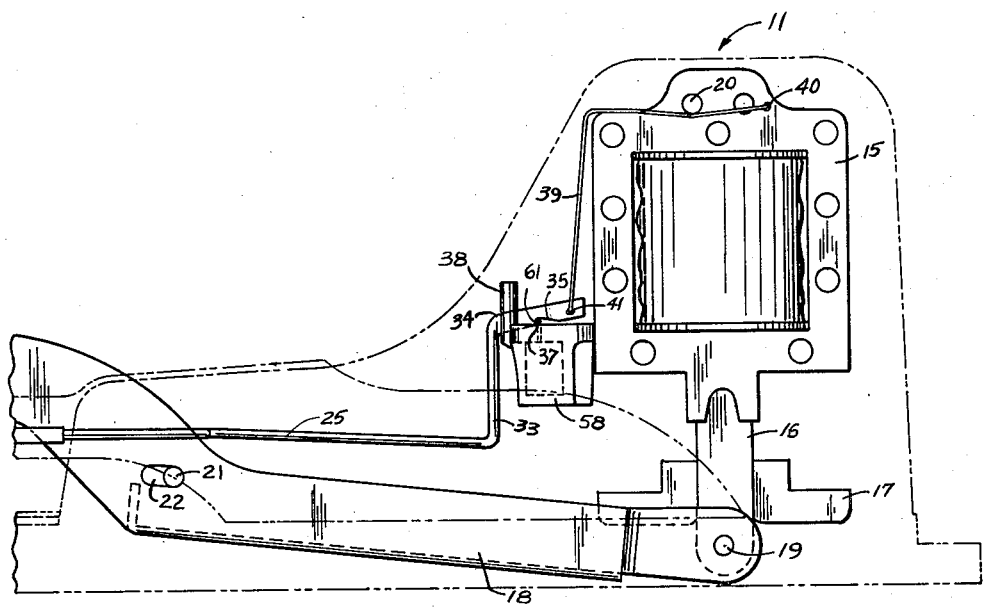
FIG. 4 is a side view of the fastening device shown in FIG. 3 with the parts of the mechanism in the same position as those of FIG. 3.
Figure 5:
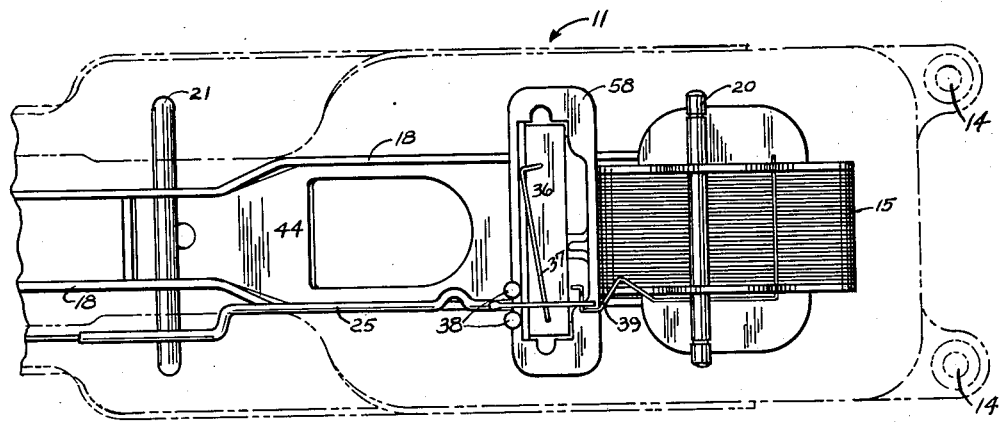
FIG. 5 is a top view of a fastening device similar to that of FIG. 1 but where the actuating member has just been placed into firing position and has actuated the switch means controlling the power means.
Figure 6:
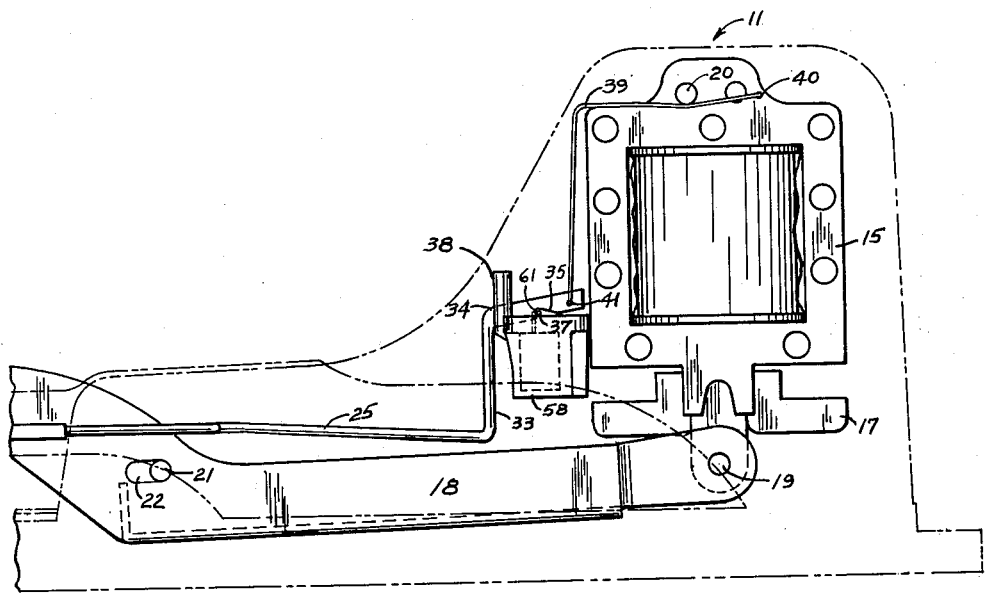
FIG. 6 is a side view of a fastening device similar to that of FIG. 5 with the parts in the same position as those of FIG. 5.
Figure 7:
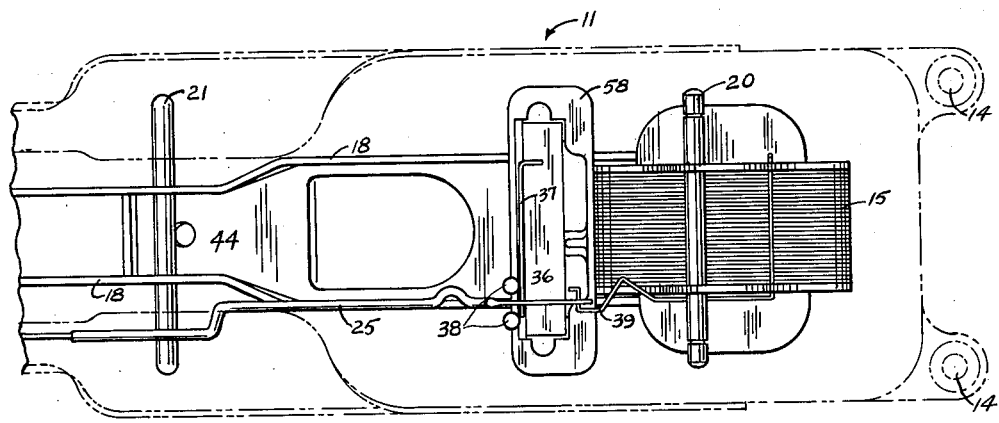
FIG. 7 is a top view of a fastening device similar to that of FIG. 1 but with the actuating member thereof in its position immediately after firing and showing the means for disengaging the switch means from the switch engaging means after full actuation thereof.
Figure 8:
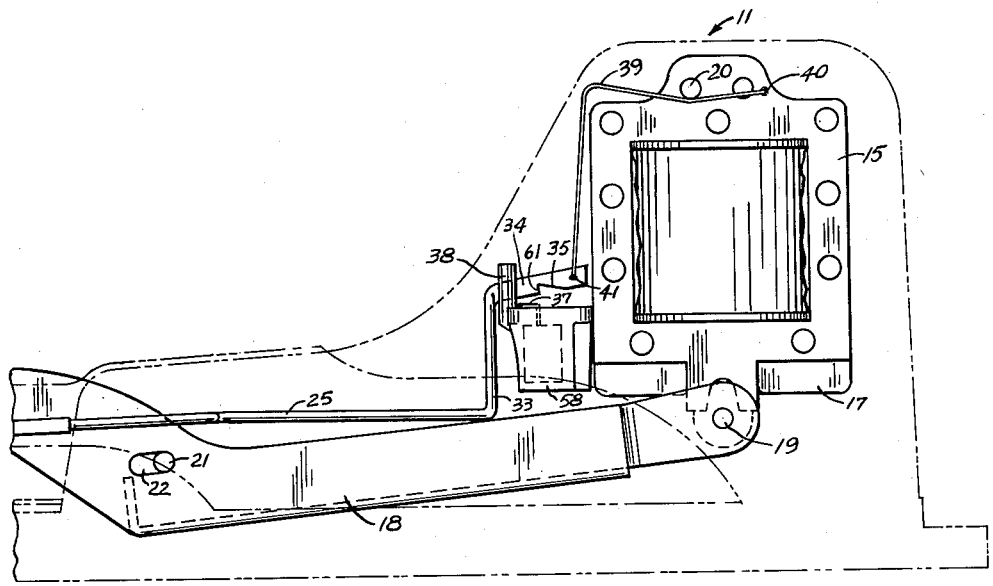
FIG. 8 is a side view of a fastening device with the parts thereof in the same position as shown in FIG. 7.

The upward movement of armature 16 moves lever arms 18 upwardly causing said arms to force rod 25 upwardly upon the completion of the stroke of armature 16 as shown in FIG. 8.

Regulating portion 34 of rod 25 is now above the level of arm 37 of switch 36 causing arm 37 to leave recess 35. Since arm 37 is spring loaded it shifts to "off" position immediately upon being displaced from recess 35 thereby cutting off power to solenoid 15 and causing armature 16 to fall downwardly assisted by weight 17. Furthermore the removal of the material to be fastened from contact with trip member 32 causes return spring 39 to move arm 25 into its normal position ready for another stroke.

However should the driving stroke of the fastening device be slow (such as would be the cause when heavy material is to be fastened), then arm 37 of switch 36 will not leave recess 35 until completion of the driving stroke. Therefore power will be applied to the solenoid until the driving stroke is completed. On the other hand if the driving stroke of the fastening device is rapid (such as would be the case if very light material is to be fastened) then the power will be cut off from the solenoid early. Thus, the instant invention provides automatic sequential timing of the fastening device to which it is secured.

It is to be noted, however, that actuation of the form of the invention shown in FIGS. 1–8 and 9–16 must be done against the pressure of return spring 39 or 47. While these springs have very light tension there are some applications where extremely light "hair trigger" action is required. For example, if tissue thin sheets of material are to be fastened together even the slight pressure of a very light return spring may be enough to prevent proper movement of rod 25 to actuate the device. The modification shown in FIGS. 21–32 is employed. The operation of this modification will now be explained.

Tripping mechanism 28 is set along rod 25 as previously described and main switch 60 (if provided) is turned on. The material to be fastened is then brought into impinging relationship with trip member 32 and pressure applied against trip member 32 by pressure of the material. This pressure moves actuating rod 25 so that side 61 of recess 35 within regulation portion 34 bears against arm 37 of switch 36 and actuates switch 36. However, it is to be noted that in this modification movement of actuating rod 25 is not against the pressure of any return spring since cam follower 53 is not under any tension and return spring 56 is in unloaded condition.

As switch 36 is actuated power flows into solenoid 15 causing armature 16 to move upwardly. The upward movement of armature 16 moves lever arms 18 upwardly. The upward movement of lever arms 18 moves rod 25 upwardly. Cam follower 53, since it is disposed within slot 55 is also moved upwardly thereby moving return spring 56 out of its normal resting position. Upward movement of rod 25 is pivotal and also moves regulating portion 34 pivotally upwardly and causes cam follower 53 to move about nose 52 of cam 51. As return spring 56 is moved upwardly it becomes loaded and applies return spring pressure to regulating portion 34. The upward movement of rod 25 also causes regulating portion 34 of rod 25 to lie above the level of arm 37 of switch 36 causing arm 37 to leave recess 35. Since arm 37 is spring loaded it shifts into "off" position at once thereby cutting off power to solenoid 15 causing armature 16 to fall downwardly assisted by weight 17. Also return spring 56, which is now under load, moves cam follower 53 along cam 51 (as shown in detail in FIG. 32) until the parts involved are placed in the normal rest position shown in detail in FIG. 29 ready for another stroke.

It is to be noted, also, that the same sequential timing is produced by this modification as the other modifications shown and power will be applied to solenoid 15 so long as the driving stroke is not completed. Power will be cut off to solenoid 15, however, immediately upon completion of the driving stroke.

The foregoing specific embodiments of this invention as set forth in the specification herein are for illustrative purposes and for purposes of example only. Various changes and modifications can obviously be made within the spirit and scope of this invention and would occur to those skilled in this art.

We claim:

1. An actuating mechanism for an electrically operated stapling machine comprising a solenoid having a movable armature, a movable actuating member having a paper trip portion at one end thereof and a regulating portion at the other end thereof provided with a switch controlling recess therewithin, a normally open fixed switch having a spring loaded throwing arm normally disposed within said switch controlling recess, a cam follower operatively connected to said actuating member adjacent said switch controlling recess, a cam abuttable with said cam follower, said regulating portion being rotatable about said cam, an upwardly movable lever arm connected to said solenoid armature and in abutting relationship with said actuating member, and a return spring connected to said lever arm and loadable by movement of said lever arm, so that movement of said lever arm disengages said throwing arm from said switch controlling recess only after full actuation of said stapling machine has occurred and said return spring member is loaded by said actuation.

2. An actuating mechanism for an electrically operated stapling machine comprising a solenoid having an upwardly movable armature, a longitudinally movable actuating member having a paper trip portion at one end thereof and a regulating portion at the other end thereof provided with a switch controlling recess therewithin, a rearwardly disposed slot adjacent said switch controlling recess, a normally open fixed switch having a spring loaded throwing arm normally disposed within said switch controlling recess, a cam follower having one end thereof disposed in said slot within said actuating member, an upwardly directed cam abuttable with said cam follower, said regulating portion being rotatable about said cam, an upwardly movable lever arm pivotally connected to said solenoid armature and in abutting relationship with said actuating member, and a return spring member in normally unloaded relationship partially disposed above said cam follower and loadable by upward movement of said lever arm, so that movement of said lever arm disengages said throwing arm from said switch controlling recess after full actuation of said staple machine has occurred.

References Cited in the file of this patent
UNITED STATES PATENTS 2,877,461     Oussani _____ Mar. 17, 1959